United States Patent [19]

Kumar

[11] Patent Number: 5,194,413
[45] Date of Patent: Mar. 16, 1993

[54] CATALYTIC CRACKING CATALYSTS AND ADDITIVES

[75] Inventor: Ranjit Kumar, Columbia, Md.

[73] Assignee: W. R. Grace & Co.-Conn., New York, N.Y.

[21] Appl. No.: 874,451

[22] Filed: Apr. 27, 1992

[51] Int. Cl.$^5$ .................. B01J 21/16; B01J 23/10; B01J 29/04
[52] U.S. Cl. .................................. 502/65; 502/73
[58] Field of Search ............................ 502/65, 73

[56] References Cited

U.S. PATENT DOCUMENTS

| | | | |
|---|---|---|---|
| 3,930,987 | 1/1976 | Grand | 208/111 |
| 4,187,199 | 2/1980 | Cuicery | 502/73 |
| 4,443,553 | 4/1984 | Chiang et al. | 502/65 |
| 4,515,683 | 5/1985 | Beck et al. | 208/113 |
| 4,921,824 | 5/1990 | Chin et al. | 502/65 |

FOREIGN PATENT DOCUMENTS

| | | | |
|---|---|---|---|
| 74501 | 3/1983 | European Pat. Off. | 502/73 |
| 2140791 | 12/1984 | United Kingdom . | |

*Primary Examiner*—Carl F. Dees
*Attorney, Agent, or Firm*—Arthur P. Savage

[57] ABSTRACT

Catalytic cracking catalysts are combined with a rare-earth, preferably lanthanum-containing catalyst/additive to enhance the cracking activity and selectivity in the presence of nickel and vanadia (Ni & V). The preferred additives comprise lanthanum, neodynium oxide and/or oxychloride dispersed in a clay/alumina matrix, wherein the alumina is derived from an aluminum hydroxychloride sol.

11 Claims, No Drawings

CATALYTIC CRACKING CATALYSTS AND ADDITIVES

The present invention relates to catalytic cracking catalysts, and more particularly, to cracking catalysts/additive compositions which are capable of converting metals-containing hydrocarbon feedstocks into valuable products such as gasoline and diesel fuel.

When zeolite-containing cracking catalysts are used to process feedstocks which contain vanadium (V), the V is deposited on the catalyst in amounts that eventually cause loss of activity and the increased production of undesirable products such as hydrogen and coke.

The prior art discloses various methods for improving the catalytic cracking activity and selectivity of catalytic cracking catalysts in the presence of V when a rare-earth component is added to the catalyst.

U.S. Pat. No. 3,930,987 describes zeolite containing cracking catalysts which are impregnated with a solution of rare-earth salts. The soluble rare-earth salts which may be used to prepare the catalysts include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valerates, lactates, malanates, oxalates, palmitates, hydroxides, tartrates, and the like.

U.S. Pat. No. 4,515,683 discloses a method for passivating vanadium on catalytic cracking catalysts wherein lanthanum is nonionically precipitated on the catalyst prior to ordinary use. In a preferred embodiment lanthanum is precipitated by the addition of ammonium hydroxide or oxalic acid to a catalyst which has been previously impregnated with a rare-earth chloride solution.

U.S. Pat. No. 4,921,824 discloses an improved catalytic cracking catalyst which contains separate and discrete particles of lanthanum oxide. The lanthanum oxide particles are added separate from and along with the catalyst during the cracking process. The lanthanum oxide additive may include an inert matrix such as clay, silica and/or a metal oxide.

Great Britain No. 2 140 791 discloses the preparation of SOx getting agents which comprise lanthanum oxide dispersed essentially as a monolayer on the surface of alumina. The lanthanum oxide-alumina compositions may be admixed with or incorporated in FCC catalysts that comprise zeolite, clay and an alumina sol binder such as aluminum chlorhydroxide.

While the prior art discloses the use of rare-earth oxides as a catalyst component or additive, the technology thus far developed does not appear to maximize the beneficial effects that may be obtained through the addition of limited quantities of rare-earth compounds.

It is therefore an object of the present invention to provide improved lanthana-containing catalytic cracking catalysts and additives that are highly effective for controlling the adverse effects of metals such as V and Ni.

It is a further object to provide rare-earth containing catalytic cracking catalysts wherein significant improvement in catalyst performance is obtained by the addition of limited quantities of a novel rare-earth containing additive.

It is yet a further object to provide a method for preparing rare-earth containing cracking catalyst additives in which the rare-earth compound, preferably lanthanum oxide ($La_2O_3$), is effectively and efficiently dispersed throughout the additive particles.

An additional object is to provide an improved method for the catalytic cracking of hydrocarbons wherein the catalysts of the present invention are reacted under catalytic conditions with hydrocarbon feedstocks that contain significant quantities of metals such as V and Ni.

These and still further objects will become readily apparent to one skilled-in-the-art from the following detailed description and specific examples.

Broadly, my invention contemplates a particulate rare earth-containing catalyst composition which comprises separate discrete particles of rare-earth, preferably lanthanum oxalate, oxide and/or oxychloride, dispersed in an inorganic oxide matrix that includes clay and an alumina binder which comprises or is derived from an aluminum hydroxy chloride sol, such as chlorhydrol.

More specifically, I have found that the catalytic performance of zeolite-containing cracking catalysts in the presence of vanadium may be improved by combining the catalyst with a particulate rare-earth-containing additive which is obtained by combining finely divided lanthanum oxalate with clay and an aluminum hydroxy chloride sol, and forming and calcining the mixture to obtain hard, dense attrition resistant particles comprising lanthanum oxide and/or oxychloride dispersed in a clay/alumina matrix.

In a preferred practice of my invention, the lanthana-containing additive is prepared as follows:

(1) Preparing an aqueous slurry comprising from about 20 to 80 weight percent lanthanum oxalate powder having average particle size of <20 microns, 25 to 70 weight percent clay, preferably kaolin, 12 to 30 weight percent aluminum hydroxychloride sol having the formulation $Al_{2+\mu}(OH)_{3\mu}Cl_6$ wherein $\mu=4$ to 12 dispersed in water and having a solids content of about 15 to 65 weight percent.

(2) Spray drying the aqueous slurry to obtain particles having a size range of 10 to 150 microns in which lanthanun oxalate particles are dispersed throughout a clay/sol matrix; and preferably (3) Calcining the spray dried particles at a temperature of 450° to 850° C. to convert the rare-earth oxalate particles to particles of rare-earth oxide and/or oxychloride, and to transform the dried alumina sol binder into dense attrition resistant alumina binder.

The preferred compositions of my invention comprise: from about 5 to 60 weight percent rare-earth oxide, oxychloride and mixtures thereof (expressed as $RE_2O_3$); from about 12 to 30 weight percent alumina binder (expressed as $Al_2O_3$); and from about 25 to 75 weight percent clay.

The calcined catalyst/additive particles possess a Davison attrition Index of 0 to 30; a density of 0.8 to 1.0 g/cc, and a surface area of 15 to 100 $m^2$/g; and a microactivity of about 15 to 20.

Microactivity (MA), as measured by ASTM method #D3907-8, of the finished additive after 4 hours @ 1500° F. steam (100%) deactivation is 19, while the MA of the finished matrix (without the lanthanum oxalate) after 4 hours @1500° F. steam (100%) deactivation is 37.

The Davison Index (DI) is determined as follows:

A 7.0 g sample of catalyst is screened to remove particles in the 0 to 20 micron size range. The particles above 20 microns are then subjected to a 1 hour test in a standard Roller Particle Size Analyzer using a hardened steel jet cup having a precision bored orifice. An air flow of 21 liters a minute is used. The Davison Index is calculated as follows:

$$\text{Davison Index} = \frac{\text{wt. \% 0-20 micron material formed during test}}{\text{wt. original 20 + micron fraction}}$$

The rare-earth oxalate used in the practice of my invention may comprise essentially 100% lanthanum and/or neodynium oxalate on a mixture of rare-earth oxalates wherein lanthanum and/or neodynium comprises the major rare-earth component(s), preferably in excess of about 40 weight percent in combination with other rare-earths such as cerium.

The rare-earth oxalate can be made by reacting rare-earth chloride solution and oxalic acid solution or by reactive rare-earth hydrate/oxide/oxychloride with oxalic acid solution.

The additive may be combined with commercial zeolite-containing fluid cracking catalysts (FCC), such as Octacat, Super-D, DA and XP catalysts manufactured and sold by the Davison Chemical Division of W. R. Grace & Co.-Conn. as a separate additive or an integral component. These catalysts typically comprise a zeolite/molecular sieve such as type X, Y, ultrastably Y (USY), rare earth exchanged Y (REY), Beta, and/or ZSM-5 dispersed in silica, alumina or silica-alumina clay matrix. Preferred zeolites are disclosed in U.S. Pat. No. 3,402,996 (CREX and CREY), U.S. Pat. No. 3,293,192, U.S. Pat. No. 3,449,070 (USY), U.S. Pat. Nos. 3,595,611, 3,607,043, 3,957,623 (PCY) and 3,676,368 (REHY). The FCC catalyst may be prepared in accordance with the teachings of U.S. Pat. No. 3,957,689, CA 967,136, U.S. Pat. No. 4,499,197, U.S. Pat. No. 4,542,118 and U.S. Pat. No. 4,458,023.

The additives of the present invention are combined with the FCC catalysts in amounts ranging from 5 to 25 weight percent, and more preferably 10 to 15 weight percent. The additives may be combined with the FCC catalysts as a separate particle component before or during use in a catalytic cracking process.

The FCC/additive compositions are used in FCC processes conducted at cracking reaction temperatures of 500° to 600° C. and regeneration temperatures of 600° to 850° C. using hydrocarbon feedstocks that may contain 100 ppm or more of V and Ni. It is found that the presence of the additive during the FCC process passivates the adverse effects of metals such as vanadium and decreases the formation of hydrogen and coke. It is anticipated that use of the present additive will permit the successful use of FCC regeneration catalysts that contain as much as 10,000 to 20,000 ppm V.

Having described the basic aspects of my invention, the following examples are given to illustrate specific embodiments.

EXAMPLE I

Preparation of Additive 1294 g of kaolin were slurried in 1702 g of aluminum hydroxy-chloride sol having the formula Al$_2$(OH)$_5$Cl·(2.5 H$_2$O). To this slurry was added 4800 g of La rich RE oxalate slurry, which was obtained by reacting lanthanum rich RE chloride solution with the solution of oxalic acid. The average particle size (APS) of the oxalate particles was <20 microns. The slurry mixture was then spray dried and finally the material was calcined at 540° C. for 2 hours.

Chemical composition and physical preparation of the additive is given in Table A.

TABLE A

Chemical Properties:
RE$_2$O$_3$ = 23.64% (La$_2$O$_3$ = 13.37%; CeO$_2$ = 2.97%; Pr$_6$O$_{11}$ = 1.99%; Nd$_2$O$_3$ = 5.23% Sm$_2$O$_3$ = 0.05%; Y$_2$O$_3$ = 0.01%)
Al$_2$O$_3$ = 45.2%
Cl = 3.86%
Na$_2$O = 0.21%
TV @ 1750° F. = 9.1%

Physical Properties:
DI = 6
H$_2$O PV = 0.24 cc/g
SA = 32 m$^2$/g
APS = 38

X-ray Diffraction:
Indicated the presence of LaOCl

EXAMPLE II

Preparation of Additive/FCC Mixtures (a) Sample A (Control) comprised 100% Orion® 822, which is a commercial FCC catalyst manufactured and sold by the Davison Chemical Division of W. R. Grace & Co.-Conn. and comprises a type Y zeolite dispersed in an imorganic oxide matrix.

(b) Sample B (Invention) comprised 85% Orion 822 +15% La-containing Additive of Example I.

EXAMPLE III

Evaluation of Additive/FCC Mixture

Catalyst samples A and B of Example II were deactivated with 5000 ppm V, using the following procedure.
Heat treat 1 hour @ 400° F. then 3 hours @ 1250° F.
Impregnate with vanadium napthenate to a level of 5000 ppm V
Heat treat 1 hour @ 400° F. then 1 hour @1450° F.
Steam for 5 hours @1450° F., 80% steam +20% air, 0 psig.

The vanadium deactivated catalysts were evaluated for microactivity (MA) using ASTM method # D 3907-8. The results are set forth in Table B.

TABLE B

|  | Sample A (Control) | Sample B (Invention) |
|---|---|---|
| V ppm | 5100 | 5020 |
| Zeolite SA m$^2$/g | 59 | 78 |
| MA | 50 | 50 |
| C/O | 4.0 | 3.2 |
| H$_2$ | 0.69 | 0.51 |
| Coke | 5.1 | 3.7 |

I claim:

1. A composition comprising discrete particles of a rare-earth compound selected from the group consisting of rare-earth oxalate, oxide, oxychloride and mixtures thereof dispersed in a clay/alumina matrix.

2. The composition of claim 1 wherein the matrix comprises clay and alumina derived from aluminum hydrochloride sol.

3. The composition of claim 1 wherein the matrix includes silica-alumina hydrogel.

4. The composition of claim 1 wherein the rare-earth component comprises about 5 to 60 weight percent La, Nd and mixtures thereof expressed as the oxide.

5. The composition of claim 1 having a particle size of 10 to 150 microns.

6. A catalytic cracking catalyst composition comprising a zeolite-containing cracking catalyst admixed with the composition of claim 1.

7. A method for preparing a particulate rare-earth-containing catalyst additive composition which comprises:
(a) preparing an aqueous mixture of rare-earth oxalate, clay and aluminum hydroxychloride sol;
(b) spray drying the mixture; and
(c) calcining the spray dried mixture at a temperature of 450° to 850° C.

8. The method of claim 7 wherein the aqueous mixture contains 15 to 65 weight percent solids.

9. The method of claim 7 wherein the aqueous mixture is spray dried to obtain particles in the size range of about 10 to 150 microns, and an attrition index of 0 to 30 DI.

10. The method of claim 7 wherein the aluminum hydroxychloride sol has the formula $Al_{2+\mu}(OH)_{3\mu}Cl_6$ wherein $\mu =$ about 4 to 12.

11. The method of claim 7 wherein the calcined particle contains lanthanum, neodynium oxychloride, oxide and mixtures thereof.

* * * * *